United States Patent [15] 3,652,776
Milde, Jr. [45] Mar. 28, 1972

[54] APPARATUS FOR SIMULATING MUSICAL SOUND EMPLOYING A SCANNABLE RECORD AND FLYING SPOT SCANNER

[72] Inventor: Karl F. Milde, Jr., 198 Baltic St., Brooklyn, N.Y. 11201

[22] Filed: July 13, 1970

[21] Appl. No.: 54,448

Related U.S. Application Data

[63] Continuation-in-part of Ser. No. 2,032, Jan. 12, 1970, abandoned.

[52] U.S. Cl. .................................................. 84/1.28, 84/1.18
[51] Int. Cl. ............................................................. G10h 3/04
[58] Field of Search ................... 84/1.18, 1.28; 271/41.61; 178/DIG. 28

[56] References Cited

UNITED STATES PATENTS

| | | | |
|---|---|---|---|
| 2,734,100 | 2/1956 | Kendall | 84/1.18 X |
| 3,484,530 | 12/1969 | Rupert | 83/1.28 X |
| 2,900,861 | 8/1959 | Davis | 84/1.28 |
| 3,250,844 | 5/1966 | Rieth | 84/1.18 |
| 3,539,701 | 11/1970 | Milde | 84/1.28 X |
| 2,125,890 | 8/1938 | Cook | 274/41.61 |

*Primary Examiner*—Lewis H. Myers
*Assistant Examiner*—U. Weldon

[57] ABSTRACT

Apparatus for simulating the sounds of a musical instrument. The apparatus includes an input device, such as keyboard, for producing signals determinative of the pitch of the notes to be played and an output device, connected to the input device, for producing notes simulating a musical instrument at the determined pitch. The simulation of the musical instrument is achieved by providing a record of the attack transient, the steady state characteristic and the decay transient of a plurality of musical notes and by reading first the attack transient, then the steady state and finally the decay transient of selected ones of these notes upon receipt of a signal or signals from the input device.

17 Claims, 12 Drawing Figures

INVENTOR
KARL F. MILDE, Jr.

INVENTOR.
KARL F. MILDE, Jr.

APPARATUS FOR SIMULATING MUSICAL SOUND EMPLOYING A SCANNABLE RECORD AND FLYING SPOT SCANNER

CROSS-REFERENCE TO RELATED APPLICATION

This application is a continuation-in-part of the application Ser. No. 2,032, filed Jan. 12, 1970, by Karl F. Milde, Jr., entitled "Apparatus for Simulating Musical Sounds" and now abandoned.

BACKGROUND OF THE INVENTION

The present invention relates to apparatus for producing musical sounds which closely approximate the sound of any one or any number of musical instruments.

There has been proposed an electrical musical instrument for producing musical notes which simulate the notes produceable by any other musical instrument. This simulation is accomplished by means of a continuously rotating magnetic drum having recorded thereon, for each note to be played, two separate portions of the note—namely, the attack transient and the steady state characteristic—on separate circumferential tracks. This prior art device operates to read first the track containing the attack transient during one complete revolution of the drum and then the track containing the steady state for as many revolutions as are necessary to complete the note.

It should be noted that the term "attack transient," as used herein, is intended to designate the irregular portion of a musical note which occurs as the sound of a note builds from silence to a nominal value. This transient occurs for only a fraction of a second as the musical instrument which plays the note is set into operation.

The term "steady state characteristic," as used herein, is intended to designate that portion of a musical note which immediately follows the attack transient. During this portion of the note the acoustical vibrations which constitute the musical note form a repetitive regular pattern.

Finally, at the end of the musical note there occurs what is known as the "decay transient." During this portion of the note, wherein the sound decays from its nominal value to silence again, the vibrations are again irregular.

It is a relatively simple matter to simulate by synthesis the steady state portion of a musical note produced by any given musical instrument. However, it is extremely difficult to synthesize—that is, generate from the constituent frequencies—either the attack or decay transient of such a note. Since both of these transients (more so the attack than the decay transient) are important, musically, to identify one instrument from another, no "music synthesizer" presently known in the art has been able to effect a genuine simulation of a musical instrument.

With apparatus using a rotating magnetic drum such as that referred to above, the attack transient may be correctly reproduced by selectively reading recorded sound. Though only the reproduction of the attack transient was contemplated in this prior art, the decay transient could conceivably be also reproduced in an analogous manner by adding a further track for each note recorded on the magnetic drum and, at the moment when a note is to be terminated, reading the decay transient from this track.

Such an arrangement would thus require three tracks or recording bands on the magnetic drum for each musical note of the well-tempered scale. For a range of four octaves this would require 144 (3 times 48) tracks and a similar number of read heads.

The magnetic drum apparatus described above also exhibits the disadvantages that, after a key on a keyboard is depressed to play a note, the reproduction of the note must await the rotation of the magnetic drum until the beginning of the recorded attack transient passes the appropriate read head. Thus, no musical note is instantaneously playable so that in fast musical passages, these delays become noticeable. It is conceivable to reduce the time between the keying of a note and the moment when the note is actually reproduced by distributing additional read heads around the circumference of the magnetic drum. In this manner, the keying time may be reduced by a factor of two or three by doubling or tripling, respectively, the number of read heads. Such modifications add to the complexity of the apparatus and result in additional expense.

SUMMARY OF THE INVENTION

It is accordingly an object of the present invention to provide apparatus for simulating musical sounds which does not admit of the disadvantages of the prior art devices described above.

It is a more particular object of the present invention to provide apparatus which will produce musical sounds substantially identical to the musical sounds producable by any other musical instrument.

These objects, as well as other objects which will become apparent in the discussion that follows, are achieved according to the present invention by providing a record of each note in the well-tempered scale of the musical instrument to be simulated and providing apparatus for reading selected ones of these notes in a particular manner which will be described below.

In order to accurately simulate or reproduce the musical notes produceable by a musical instrument, a recording of each note of that instrument is provided which includes the attack transient, a short sample of the steady state characteristic and the decay transient of each note. When a particular note is to be reproduced, the reading apparatus reads from the record first the attack transient, then the steady state characteristic, and finally the decay transient of that note. Since the recorded sample of the steady state characteristic is relatively short, this characteristic is repetitively read for as long as the note is to be played.

According to a preferred embodiment of the present invention the record itself is a photographic film which preferably carries the recorded information as a series of strips of varying transparency. The film is read by providing a so-called "flying spot scanner;" that is, a device for passing light through selected portions of the film and one or more photocells arranged in the path of the light passed through the film for producing an output dependent upon the variations in the light caused by the film.

The flying spot scanner is conveniently realized by providing a cathode ray tube on one side of the film and a convex lens on the other for focusing all the light that passes through the film on a single photocell. Through the use of suitable horizontal and vertical deflection apparatus, it is possible to precisely control the position and movement of a spot of light on the cathode ray tube screen. It is therefore possible to pass light through the film regions of any of the plurality of notes recorded on the film and to repetitively scan those portions of the film on which are recorded the steady state characteristics of the notes to be played.

DESCRIPTION OF THE PREFERRED EMBODIMENTS

Figures 1, 2, 3, 4:
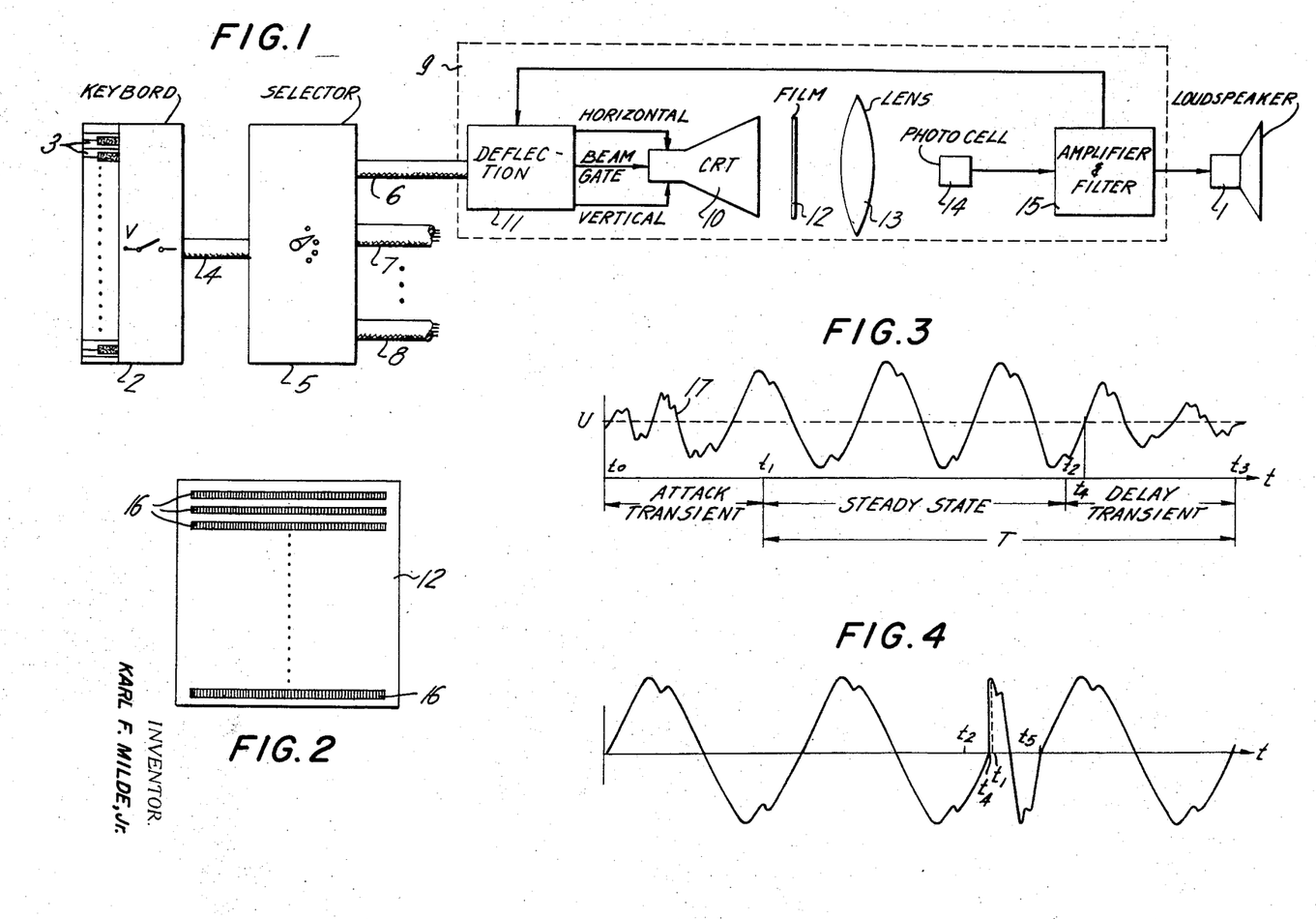
FIG. 1 is a schematic diagram of a preferred embodiment of an electrical musical instrument according to the present invention.
FIG. 2 is a plan view of a film record which may be employed with the apparatus of FIG. 1.
FIG. 3 is a signal diagram showing a sample of the information recorded on the film of FIG. 2.
FIG. 4 is a signal diagram, drawn with a different time scale than the diagram of FIG. 3, showing a signal produced at the photocell during a repetitive scan of the steady state portion of the signal of FIG. 3.

FIG. 1 illustrates, in block form, a preferred embodiment of the electrical musical instrument according to the present invention. This apparatus operates to produce sounds at a loudspeaker 1 which closely approximate the musical sounds produceable by any other musical instrument or instruments. For convenience the apparatus according to the present invention may be constructed to play only the notes of the well-tempered scale; however, it will be appreciated from the discussion that follows that notes of any selected pitch may be reproduced with this apparatus.

The note or notes to be played by the apparatus according to the present invention are selected by the operator using a manually operated keyboard 2. In the case where the notes to be played are all of the well-tempered scale, a conventional keyboard may be used such as that employed to operate an electronic organ. Such a keyboard has a plurality of keys 3 both black and white which, when depressed, connect a source of voltage V to a corresponding number of output wires. These wires are shown only symbolically in FIG. 1 as a cable 4.

It will be understood that the apparatus of FIG. 1 may be controlled by various other signal producing devices known in the art instead of a keyboard. For example, the apparatus may be controlled by a punched paper tape such as that shown and described in the U.S. Pat. No. 2,855,816 to Olson et al.

The cable 4 containing one input line for each of the keys on the keyboard is connected to a selector device 5. This selector connects the plurality of input lines to a selected one of a number of cables 6, 7 and 8 each containing a similar number of output lines. As indicated in FIG. 1, there may be as many of these cables containing a set of output lines as is desired. The number of sets of output lines is limited only by the complexity and cost of the apparatus.

The purpose of the selector 5 is twofold. In the first instance, the selector permits a number of musical notes to be simultaneously played. In its preferred and simplest embodiment, a note reading system 9, which is illustrated in FIG. 1, can read and thus play only a single note at a time. Consequently, when it is anticipated that a plurality of notes will be simultaneously played, it is necessary to provide a separate reading system for each of these notes. Thus, in the case of a keyboard to be manually operated by a maximum of 10 fingers, there may be 10 sets of output lines on the selector 5, each connected to a separate reading system.

The selector device 5 may also serve an additional function. Since the apparatus according to the present invention is capable of simulating the notes of any musical instrument, it may be desirable to provide additional note reading systems so that the notes of several musical instruments may be played simultaneously. In this instance, the selector 5 may be manually operated in the manner of an organ stop to connect and disconnect the reading systems for different instruments to the keyboard 2.

It will be understood from the explanation above that each of the output cables 6, 7 and 8 is connected to a reading system identical to the reading system 9 shown in FIG. 1.

The reading system 9 comprises a cathode ray tube 10 with its associated deflection circuitry 11, a film or record 12, a lens 13, a photocell 14 at a focal point of the lens and an amplifier and filter 15 having outputs both to the deflection unit 11 and the loudspeaker 1.

The reading system 9 shown in FIG. 1 is of the type commonly known in the art as a "flying spot scanner." Electrical signals recorded on the film 12 as variations in the film transparency are converted into electrical signals by moving a spot of light produced on the screen of the cathode ray tube 10 across the surface of the film 12 and focusing the light which passes through the film on the photocell 14. Although the film 12 is illustrated as displaced somewhat from the cathode ray tube 10, this film is preferably disposed directly adjacent the cathode ray tube screen.

An example of the film 12 showing the manner of recording is illustrated in FIG. 2. On this film are recorded a series of horizontal lines 16, preferably one line for each note to be played. For four octaves of the well-tempered scale the film 12 would be provided with 4 times 12 or 48 lines.

It will be understood that the particular arrangement of each recorded note on the film 12 is entirely a matter of design. For example, the lines need not extend the entire width of the film, as shown, but can be made shorter and arranged in two or more columns. In this way, more than 48 notes can be recorded on a single film so that, by providing the cathode ray tube with a suitable gun for generating a corresponding number of cathode ray beams, two or more notes can be read simultaneously.

The notes recorded on the film each take the form shown in FIG. 3. At a certain transparency bias level U there is recorded a signal 17 constituting the aforementioned three portions of the note; namely, the attack transient, the steady state characteristic and the decay transient. The attack transient is indicated as extending from time $t_0$ to $t_1$; the steady state characteristic from $t_1$ to $t_2$ and the decay transient from $t_2$ to $t_3$. The steady state characteristic can be made any arbitrary length so that the total length of the recorded note will suitably fit the space available on the film 12. Since the cycles will be repetitively read to simulate a continuous note, however, it is only necessary to provide a few exemplary cycles of the steady state portion so that total period T between $t_1$ and $t_3$ will be merely a fraction of a second. The oscillations recorded on the film 12 are recorded in a manner analogous to the well known technique of recording sound on cinema film. In particular, the oscillations are recorded as variations in the opacity of the film about the bias level U which is some nominal or normal partial transparency. The entire film itself, with the exception of the recording areas, preferably exhibits this bias level of transparency so that whenever the flying spot produced on the screen of the cathode ray tube moves beyond the bounds of the line of recording, the photocell will produce no incremental signal output. It will be understood that the term "film," as used herein, is intended also to include a photographic plate.

FIG. 4 is an incremental signal diagram, not drawn to the same scale as the diagram of FIG. 3, which illustrates the technique by which the flying spot is recycled to repetitively read the steady state characteristic of the note. As the flying spot produced on the screen of the cathode ray tube 10 sweeps across the portion of the film 12 on which is recorded the steady state characteristic of a particular note, it reaches a point, at time $t_2$, which initiates the recycle of the sweep. At time $t_2$ the deflection device 11 begins to look for the next positive-going zero crossing of the signal produced by the photocell 14. When this occurs, at time $t_4$, the sweep is quickly recycled to a point, indicated as $t_1$ in FIGS. 3 and 4, which represents the approximate beginning of the steady state characteristic of the note. Once recycled, the flying spot moves quickly forward again until the photocell 14 detects the next zero crossing of positive slope at time $t_5$. When this occurs, the flying spot is slowed to the normal reading speed so that the signal generated by the photocell will be an accurate representation of the recorded note.

The purpose of the recycling technique just described is to produce an audio output signal which exhibits no audible "click" at each recycle. Although there appears to be a marked discontinuity in the signal shown in FIG. 4 at the moment when the flying spot is recycled and moved quickly forward to the next zero crossing of positive slope, it is possible to carry out this recycling program in so short a time as to be unnoticeable. As will be evident from FIG. 4, the signal frequencies produced by the photocell 14 during recycling will be well above the audible range so that the only practical discontinuity arises from the fact that the tail, at $t_4$, of the signal produced during one sweep is not coincident with the beginning, at $t_5$, of the signal produced by the subsequent sweep. This discontinuity can be vanishingly small by appropriately fast control of the cathode ray tube beam so that no discontinuity will be audible at all.

Figure 5:
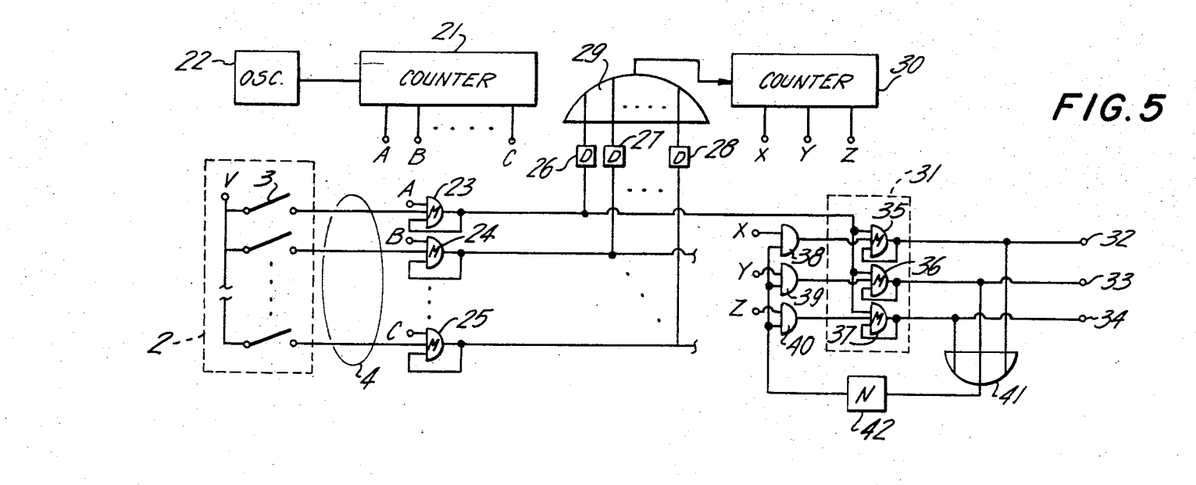
FIG. 5 is a block diagram of a selector which may be employed with the apparatus of FIG. 1.

FIG. 5 illustrates a possible embodiment of the selector 5 shown in block form in FIG. 1. This selector continuously samples the inputs 4 from the switches of the keyboard 2 and connects these inputs to a selected one of a plurality of reading systems 9. The purpose of the selector is to connect simultaneously occuring input signals to different reading systems since the reading systems are capable of reading only one note at a time.

As noted above, it is possible to employ multiple beam guns in the cathode ray tube of a single reading system in order to simultaneously scan a plurality of notes on the same film. In this case, however, a selector device such as that shown in FIG. 5 will still be necessary to steer the input signals to the various guns. The same is true where a single gun is used to scan a plurality of recorded notes by successively scanning small portions of each record at a rapid sequential rate.

The circuit of FIG. 5 functions in the following manner. A counter 21 driven at a rapid rate by a pulse generator 22 sequentially produces pulses at a series of outputs A, B and C. The number of these outputs A, B and C equals the number of keys 3 on the keyboard 2.

Each of the keys 3 operates as a normally open switch which connects a source of potential V to a corresponding input in the cable 4. These inputs are connected to a similar number of majority gates 23, 24 and 25 as are the inputs A, B and C. When a key is depressed, therefore, a signal will be applied to a corresponding majority gate. This gate produces an output if, and only if, signals are present on at least two of its three inputs. Since one of its inputs is connected to its output terminal this gate will produce an output signal only upon receipt of such a signal from a depressed key 3 together with the next pulse from the counter 21. Once an output signal is generated, the majority gate will maintain the signal as long as the corresponding key 3 remains depressed.

The function of the counter 21, oscillator 22 and the majority gate 23, 24 and 25 is simply to prevent the exactly simultaneous occurrence of signals to the remainder of the selector device. It will be appreciated that, even though two keys 3 of the keyboard 2 are simultaneously depressed, the outputs 23 - 25 the gates 23-25 will be spaced slightly in time by the counter 21.

When a depressed key 3 is later released, the output signal of the corresponding majority gate will immediately cease since the requisite two input signals will not be present.

The outputs of the majority gates 23, 24 and 25 are each connected to a corresponding differentiating device D, designated as 26, 27 and 28, respectively. These devices D will pass an output pulse to an OR-gate 29 only upon receipt of the leading edge of an output signal from their corresponding majority gates. That is, when a key 3 is depressed and causes a majority gate to produce an output signal, a pulse will be produced at the output of the corresponding differentiating device and applied to a counter 30 via the OR-gate 29.

Like the counter 21, the counter 30 operates to produce an output signal on one of a series of output terminals X, Y and Z. Whenever the counter is indexed, the signal will appear at a successive one of the output terminals so that an output will first appear at the X terminal, then the Y, the Z, then the X again, etc. The number of terminals should correspond to the number of reading systems 9 employed with the musical sound simulating apparatus.

Each of the majority gates 23, 24 and 25 is also connected to a selector circuit 31 which passes the signal received from a corresponding one of these majority gates to one of three outputs 32, 33 and 34. Each of these outputs supplies a separate reading system 9. For purposes of clarity, one such selector circuit 31, connected to the majority gate 23, is illustrated in FIG. 5. It will be understood, however, that each of the remaining majority gates is likewise provided with identical selector apparatus.

The majority gate 23 is connected to one input of three additional majority gates 35, 36 and 37. Like the majority gate 23, these majority gates produce an output if, and only if, a signal is present on two or more of their three inputs. The outputs of three AND-gates 38, 39 and 40 are respectively connected to a second input of the gates 35, 36 and 37. Finally, the third input of these majority gates is connected to the output terminal of the respective gate.

The AND-gates 38, 39 and 40, receive inputs from the terminals X, Y and Z, respectively, of the counter 30. The second input of these AND-gates is obtained from a circuit consisting an OR-gate 41 and an inverter 42. The OR-gate 41 produces an output signal whenever a signal appears on one of the output lines 32, 33 or 34. This output signal of the OR-gate 41 is inverted so that no signal will be applied to the AND-gates 38–40 when a signal is present on one of the lines 32–34. At the moment when the leading edge of a signal from the majority gate 23 appears at the selector device 31, one of the AND-gates 38–40 will produce an output signal. The signal from the majority gate 23 will accordingly be passed by one of the majority gates 35, 36 and 37. The appearance of an output signal on one of the lines 32, 33 or 34 will cause an output to be produced by the OR-gate 41 so that all of the AND-gates 38, 39 and 40 will become disabled. The removal of this AND-gate generated input signal from the signal producing majority gate 35, 36 or 37 will not interrupt the output signal, however, due to the majority gate feed back loop, as long as the signal from the majority gate 23 remains present. Thereafter, delayed somewhat by the circuitry, or if necessary by a short delay line, the counter 30 will be indexed so as to produce an output at a different one of its terminals X, Y and Z. This indexing will cause the next note, whether played simultaneously with the previous note or not, to be read by a different reading system 9.

Figure 6:
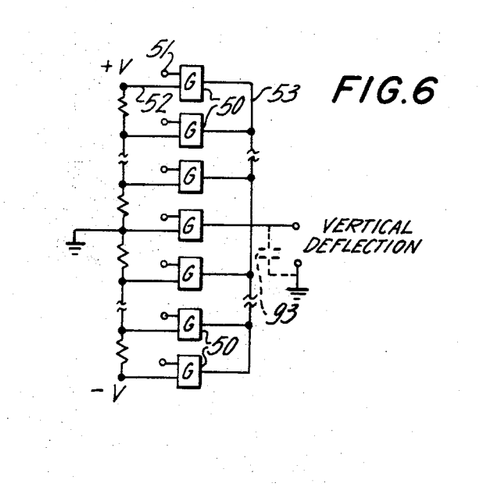
FIG. 6 is a schematic diagram of a vertical deflection signal generator which may be employed with the apparatus of FIG. 1.

FIG. 6 illustrates a simple embodiment for effecting the vertical deflection of the cathode ray beam of the cathode ray tube 10. This embodiment includes a plurality of gates 50, having two inputs 51 and 52. The first of these inputs 51 is connected to one of the keys 3 of the keyboard 2. When a particular key 3 is depressed, the signal applied to the input 51 of the associated gate gates the voltage present at its input 52 to its output 53. This voltage is then applied to the vertical deflection plates of the cathode ray tube to effect the appropriate deflection of the cathode ray tube beam. By proper choice of the voltages applied to the inputs 52 of the gates 50, the beam can be selectively deflected to scan the particular lines 16 on the film 12 on which are recorded the different musical notes.

Figure 7:
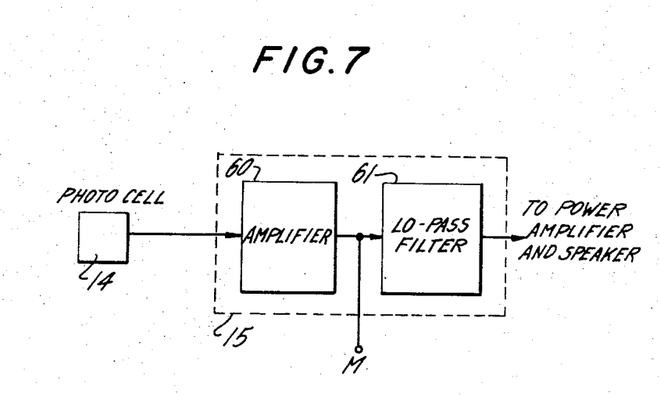
FIG. 7 is a block diagram of an amplifier and filter which may be employed in the apparatus of FIG. 1.

FIG. 7 is a block diagram showing the photocell 14 and the amplifier and filter 15 which appear in FIG. 1. The output of the photocell 14 is amplified by a wide-band amplifier 60 and is passed through a filter 61 which attenuates the signal frequencies which lie above audible range. The resulting signal may then be presented to conventional sound reproduction equipment comprising an audio amplifier and speaker system. It is also clearly possible to record the output of the filter 61 for later reproduction at a convenient time.

Since most audio equipment such as recorders, amplifiers, speakers and the like is insensitive to frequencies above the audible range, it will be possible, in most cases, to eliminate the low-pass filter 61. This filter is included in the embodiment of FIG. 7 primarily to illustrate the fact that the output of the amplifier 60 should contain all the frequencies of the signal produced by the photocell 14. Such an output, designated M in FIG. 7, is necessary for the control of the horizontal deflection unit which will now be described in connection with FIGS. 8–10.

Figure 8:
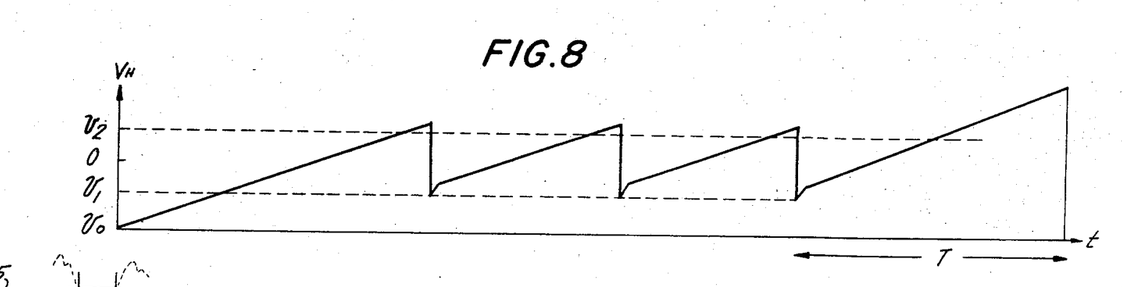
FIG. 8 is a signal diagram showing a sample of a horizontal deflection signal which may be generated in the apparatus of FIG. 1.
Figure 9:
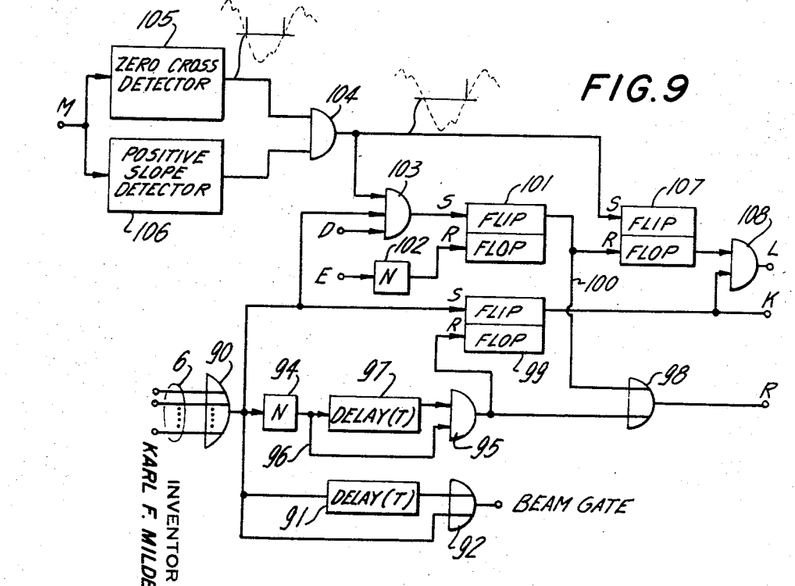
FIG. 9 is a block diagram of a first portion of a horizontal deflection signal generator which may be employed in the apparatus of FIG. 1.
Figure 10:
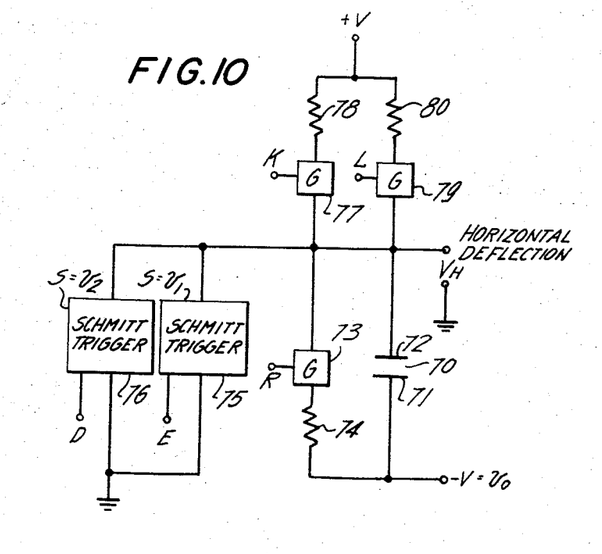
FIG. 10 is a schematic diagram of a second portion of a horizontal deflection signal generator suitable for connection to the apparatus of FIG. 9.

FIG. 8 illustrates a typical time response of a voltage $V_H$ applied to the horizontal deflection plates of the cathode ray tube 10. FIGS. 9 and 10, taken together, illustrate in block form a preferred embodiment of a device capable of producing a deflection voltage of the type illustrated in FIG. 8.

FIG. 8 illustrates the deflection voltage $V_H$ which is required to cause one musical note on the film 12 to be scanned. At the moment when a key 3 of the keyboard 2 is depressed, a negative voltage $v_o$ is applied to the horizontal deflection plates of the cathode ray tube 10 which will cause the cathode ray tube beam to produce a spot on the screen opposite the point where the beginning of a musical note is recorded on the film 12. The deflection voltage $V_H$ is then caused to increase at a constant rate so as to move this spot on the cathode ray tube screen in the direction of the recorded lines 16 of the film 12. The light passing through a line on the film and focused on the photocell 14 by the lens 13 will cause the photocell to produce a signal representing first the attack transient and then the steady state characteristic of the recorded musical note. Just before reaching the portion of the line on the film 12 on which is recorded the decay transient of the note, $V_H$ will exceed a reference voltage $v_2$ and, after the next positive going zero crossing of the signal produced by the photocell, $V_H$ is quickly reduced to a voltage $v_1$. When $V_H$ equals $v_2$, the spot on the cathode ray tube screen will therefore be near the end of the steady state characteristic recorded on the film 12; when $V_H$ equals $v_1$, the spot will be aimed at the start of the steady state characteristic recording.

The deflection voltage $V_H$ is then quickly increased until the next positive-going zero crossing appears in the output signal of the photocell 14. When this occurs, the voltage $V_H$ is again increased toward $v_2$ at the normal scanning rate and the steady state characteristic reread from the film 12.

The reading of the steady state characteristic will repetitively recur as long as the key 3 of the keyboard 2 remains depressed. When the key 3 is released, the voltage $V_H$ is then allowed to increase above the voltage $v_2$ so that the spot on the cathode ray tube screen will scan the decay transient of the musical note recorded on the film 12.

In practice, it is advantageous simply to allow the voltage $V_H$ to continue to rise at a constant rate for a time T from whatever value it happens to have when the key 3 is released. The time T is chosen sufficiently large to ensure that the recorded decay transient will be read even though $V_H$ has just been reduced to $v_1$. If $V_H$ happens to close to $v_2$ at the moment the key is released, the sweep of the light spot on the cathode ray tube screen will simply extend beyond the line 16 where the musical note is recorded. Since the film 12 will exhibit a uniform partial transparency at the bias value U in the areas where no music is recorded, the scan of the non-recorded areas will produce no signal at the output of the photocell 14.

FIGS. 9 and 10 illustrate, in block form, a single unit for producing the horizontal deflection voltage $V_H$. The unit has been separated into two figures for convenience and clarity.

As may be seen in FIG. 10, the horizontal sweep voltage is generated in the conventional manner by increasing the charge on a capacitor 70 at a substantially linear rate. The lower plate 71 of the capacitor is maintained at the reference voltage $v_o$, which is negative with respect to ground, while the voltage on the upper plate 72 is varied, by means of apparatus which will be described immediately below, so as to vary the horizontal deflection voltage $V_H$ in the manner illustrated in FIG. 8. Since the spot on the cathode ray tube screen is to be moved horizontally from one side of the screen to the other the deflection voltage will exhibit both positive and negative values during the course of the scan.

At the start of the operation, the upper plate 72 of the capacitor 70 initially carries the voltage $v_o$ since the capacitor 70 is short-circuited by means of a gate 73 and resister 74. The gate 73 is a closed circuit between its upper and lower terminals whenever a voltage is present at its input terminal R. The resistor 74 is of very low value and is only included in the circuit to reduce the discharge rate of the capacitor 70 to a rate which will permit the actuation of "Schmitt trigger" circuits 75 and 76 when the voltage $V_H$ passes the threshold or reference voltages $v_1$ and $v_2$, respectively.

At the beginning of the scanning cycle, an input voltage present at the input R of the gate 73 is removed and a voltage applied to the input terminal K of a gate 77. The application of this latter input voltage closes the path through the gate 77 permitting an approximately constant current to flow through a high-valued resister 78. As a result, the voltage on the upper plate 72 of the capacitor 70 and, accordingly, the horizontal deflection voltage $V_H$ will be caused to linearly increase from the reference voltage $v_o$.

When $V_H$ increases to the value of $v_1$, the Schmitt trigger 75 will change its state and produce a signal at its output E. When $V_H$ reaches $v_2$, the Schmitt trigger 76 will change its state and produce a signal at its output D. Shortly thereafter, if the flying spot is to rescan the steady state characteristic of the musical note recorded on film, a signal will appear at the input R of the gate 73 causing the capacitor 70 to rapidly discharge. When $V_H$ drops to a voltage equal to $v_1$, the signal at the output E of the Schmitt trigger 75 will momentarily disappear. This disappearance will cause the removal of the signal at the input R so that further discharge of the capacitor is prevented. In the meantime, a signal will be applied to the input L of a gate 79 causing current to flow through a low-valued resister 80. This current rapidly increases the charge on the capacitor 70 for a short time until the next positive zero crossing of the musical signal has been scanned. When this zero crossing occurs the signal applied to the input L is removed and the capacitor 70 allowed to charge at the normal rate through the resister 78.

When, at the end of the musical note, it is necessary to read the decay transient of the note recorded on the film, the horizontal deflection voltage $V_H$ is allowed to increase above $v_2$ independently of the operation of the Schmitt trigger 76. Thus the capacitor 70 is discharged, by application of a signal to the input R at the gate 73, only after the lapse of a prescribed time T.

The circuit for applying the signals to the inputs R, K and L of the gates 73, 77 and 79, respectively, will now be described in connection with FIG. 9.

The apparatus of FIG. 9 is actuated by the presence of a signal at any one of the individual outputs in the cable 6 of the selector 5 (FIG. 1); that is, upon depression of any one of the keys 3 of the keyboard 2. When such a signal appears, it is passed through an OR-gate 90 and applied to a number of different circuit elements as indicated below.

The output of the OR-gate 90 may first be utilized to turn on the beam of the cathode ray tube 10. This may be accomplished in a conventional manner by changing the potential on a cathode ray tube grid in response to a beam gate signal. It is also possible simply to leave on the cathode ray tube beam at all times during the operation of the reading system 9 since a spot on the cathode ray tube screen which does not move will not produce any incremental signal in the output of the photocell 14, and, whenever a musical note is not being read, the flying spot will not be moved about the screen.

In order to maintain the cathode ray beam on for a short time after a key 3 of the keyboard 2 is released, the beam gate circuit is provided with a delay line 91 of period T. Both the delay line 91 and the OR-gate 90 are connected to a common beam gate output through an OR-gate 92.

It should be noted, at this point, that a similar delay circuit may be provided in the vertical deflection circuit illustrated in FIG. 6. In this case the delay circuit will take the form of a capacitor 93 which maintains approximately constant the vertical deflection voltage after removal of a signal at the input 51 of one of the gates 50.

The output of the OR-gate 90 is also supplied to an inverter 94. The output of the inverter 94 is connected to an AND-gate 95 both directly, by means of the line 96, and indirectly via a delay line 97. Like the delay line 91, the delay line 97 provides an output signal identical to its input signal at a time T later.

When no keys 3 of the keyboard 2 are depressed, and no signal appears at the output of the OR-gate 90, the inverter 94 supplies both delayed and undelayed signals to the AND-gate 95. The AND-gate 95 thus presents an actuating signal to the terminal R through an OR-gate 98 as well as a reset signal to a flip-flop 99. As soon as a key 3 is depressed the signal on the line 96 will be interrupted so that, unless an input signal is present on the other line 100 connected to the input of the OR-gate 98, the signal at R will terminate.

It may be easily seen that no signal will appear on the line 100 since the flip-flop 101 will be maintained in its reset state by the output of an inverter 102 so long as the deflection voltage $V_H$ lies below $v_1$ and the Schmitt trigger 75 produces no voltage at its output E.

The output of the OR-gate 90 is also connected to set the flip-flop 99 to provide a signal to the input terminal K of the gate 77. Therefore, when a key 3 of the keyboard 3 is depressed, the gate 73 will be opened and the gate 77 closed allowing a charge to accumulate on the plates of the capacitor 70. When the voltage $V_H$ reaches $v_1$, the Schmitt trigger 75 will produce a signal at its output E. The presence of this output will remove the signal at the reset input of the flip-flop 101.

As the voltage $V_H$ increases further and reaches $v_2$, the Schmitt trigger 76 will produce a signal at its output D. This signal is supplied to an AND-gate 103 which has three inputs. In addition to the input from the output D of the Schmitt trigger 76, the AND-gate 103 is connected to receive the output of the OR-gate 90 and the output of a further AND-gate 104. The signal from the output of the OR-gate 90 will be present so long as the key 3 remains depressed. A signal will be produced at the output of the AND-gate 104 only at the instant that the musical signal produced by the photocell 14 crosses the zero axis in the positive direction.

A pulse at the instant of a positive zero crossing may be obtained by requiring the coincidence of a zero crossing and a positive slope. Accordingly, the unfiltered but amplified output M of the photocell 14 may be supplied to both a zero-cross detector 105 and a positive slope detector 106. These detectors are, in turn, connected to the inputs of the AND-gate 104. In practice, the zero-cross detector may be simply realized by a voltage comparison device which continuously compares the input signal from the photocell output M with a zero voltage. The positive slope detector may be realized by a differentiation stage connected to an amplifier so biased that negative outputs from the differentiator are "chopped" or removed.

When the voltage $V_H$ reaches and exceeds $v_2$, therefore, the AND-gate 103 will produce an output at the next positive-going zero crossing of the output of the photocell 14. The output signal from the AND-gate 103 will set the flip-flop 101 and thereby cause a signal to be produced on the line 100. This signal on the line 100 will be passed to the input terminal R of the gate 73 causing that gate to close and connect the low-value resistor 74 across the capacitor 70. The voltage $V_H$ will thus be quickly reduced until it reaches the value $v_1$. When $V_H$ equals $v_1$, the Schmitt trigger 75 will interrupt the signal at its output E permitting the inverter 102 to reset the flip-flop 101.

The signal on line 100 will also constrain a third flip-flop 107 to remain in its reset state during this reduction in the horizontal deflection voltage $V_H$. After the flip-flop 101 has been reset, the flip-flop 107 will remain in its reset state until the next positive-going zero crossing of the output of the photocell 14. While in the reset state, the flip-flop 107 will provide a signal to an AND-gate 108. This AND-gate will be operative to pass this signal so long as the flip-flop 99 has been set by the output of the OR-gate 90. The AND-gate 108 will thereby apply a signal to the input terminal L of the gate 79 so that, provided the gate 73 is open, the capacitor 70 will be rapidly charged. $V_H$ will, therefore, quickly increase until the flip-flop 107 is set again by a pulse from the AND-gate 104 at the instant of the next positive-going zero crossing.

When the signal at the input L of the gate 79 is removed, the horizontal deflection voltage $V_H$ will increase at its normal rate so long as a signal is present at the input terminal K of the gate 77 to keep this gate closed. If the key 3 of the keyboard 2 remains depressed, $V_H$ will then be reduced again to $v_1$ and the entire cycle repeated as described above after $V_H$ again reaches $v_2$.

If the key 3 of the keyboard 2 is released, the action of the Schmitt trigger 76 will be inhibited due to the absence of an output signal from the OR-gate 90 at an input of the AND-gate 103. $V_H$ will thus continue to increase so long as the flip-flop 99 remains set and passes a signal to the input terminal K of the gate 77. After a delay of a period T, the inverter 94 will apply signals to the AND-gate 95 both directly through the line 96 and through the delay line 97. This AND-gate 95 will then reset the flip-flop 99 and apply a signal to the input terminal R of the gate 73 through the OR-gate 98. The gate 73 will thereby close and cause the capacitor 70 to discharge completely in readiness for the next scanning operation.

It will be appreciated from the above description of the present invention that the frequency of the reproduced sound will depend upon the horizontal rate of scan. In particular, if the scanning rate is increased, the reproduced notes will exhibit a higher pitch; and if the scanning rate is decreased, the notes will be of lower pitch. The resistor 78 in the apparatus of FIG. 10, which determines the rate of increase or slope of the voltage $V_H$ (FIG. 8), should therefore be chosen to provide a scanning rate which will reproduce notes at their original and proper pitch.

It is preferable, as described above, to record each note of the well-tempered scale on a separate area of the film 12 and to reproduce each note by scanning that area at the proper rate. Even for a single musical instrument, the harmonic balance of the steady state portion, as well as the length and character of the attack and decay transients varies from note to note. However, this variance among the notes produced by a single instrument is not as great as the harmonic difference between notes, even of identical pitch, which are produced by different instruments. This fact may be appreciated by playing and noting the character of different stops on a pipe organ: the notes within each stop are relatively similar, whereas the notes of even identical pitch for different stops have a totally different "sound."

The similarity of sound among the notes of a particular stop may be utilized to advantage, according to a further preferred embodiment of the present invention, by recording on the film 12 a *single note* for each *stop*, and scanning the film at different rates to produce the notes of differing pitch. This arrangement permits a number of stops to be recorded on one film 12.

As an example, the notes of a number of different stops may be arranged vertically as shown in FIG. 2 and the vertical deflection generator of FIG. 6 employed to select the stop. In this case, each stop switch would be connected to an input 51 to selectively open one of the gates 50.

The pitch of the notes may be selected by apparatus which controls the scanning rate. A preferred embodiment of such apparatus is illustrated in FIG. 11.

Figure 11:
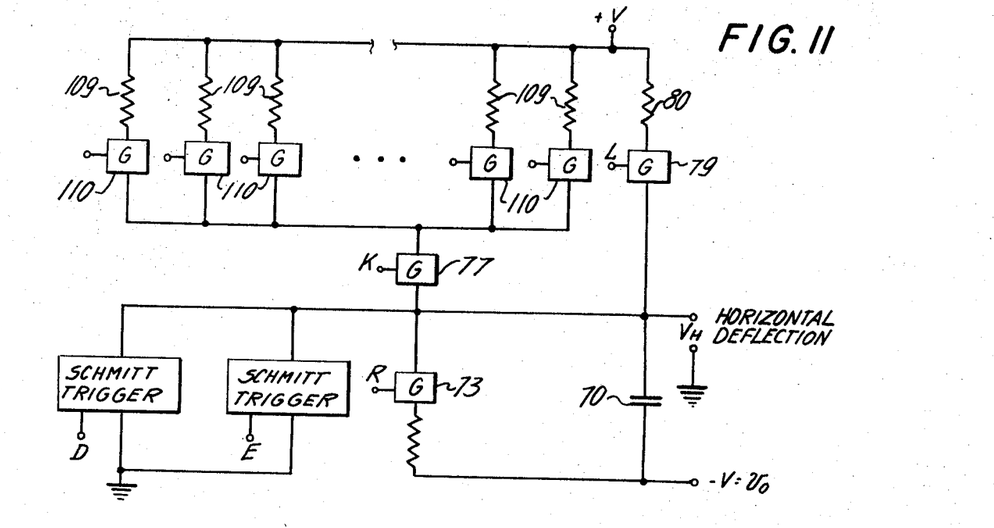
FIG. 11 is a schematic diagram of an alternative embodiment of the horizontal deflection signal generator of FIG. 10.

The apparatus of FIG. 11 is identical to the apparatus of FIG. 10 with the following exception: the resistor 78 shown in FIG. 10 has been replaced by a plurality of resistors 109 and gates 110. Each of the gates 110 are connected to one of the keys 3 of the keyboard 2. When a key is depressed, the corresponding gate connects its associated resistor 109 to the gate 77.

The values of the resistors 109, which determine the scanning rate, are all slightly different. When connected in the circuit, they produce the horizontal scanning rates necessary to reproduce the different notes of the well-tempered scale.

As an alternative, it is possible to reduce the number of resistors 109 and gates 110 by connecting certain keys 3 to a number of gates so that, when depressed, a group of resistors will be connected to the gate 77. The resistors can then be selected so that different combinations of a few resistors will cover the entire scanning rate range.

Figure 12:
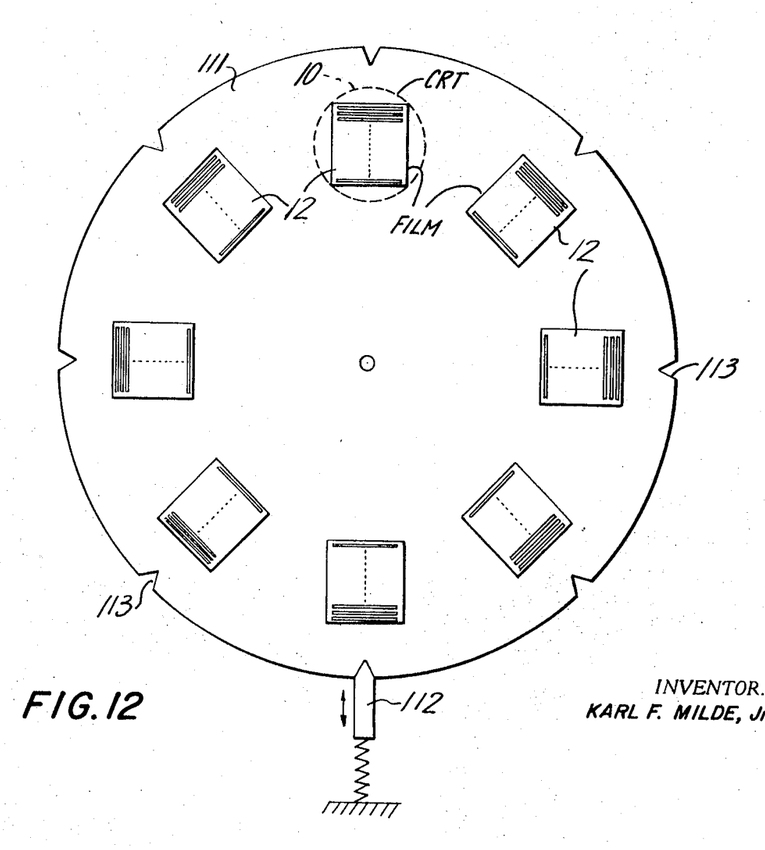
FIG. 12 is a front elevational view of a device, according to the present invention, for changing the record to be scanned by the apparatus of FIG. 1.

FIG. 12 illustrates further apparatus for changing the stop in the sound reproducing system of the present invention. This apparatus is simply a disc 111 containing a number of film inserts 12. The disc is arranged so that each insert can be selectively moved into position in front of the screen of the cathode ray tube 10. A detent device 112 is provided in conjunction with notches 113 in the disc to align the disc and hold it in position. The disc can be moved by hand, or moved automatically with the aid of a conventional drive mechanism (not shown), to select the film containing the recording of the desired stop.

The description of the specific preferred embodiments of the present invention is now complete. It will be understood, however, that the invention is not intended to be limited to these preferred embodiments; rather, it is susceptible to those various changes, modifications and variations which will occur to those skilled in the art. For example, as mentioned above, it is possible to record a complete set of notes of more than a single instrument on the film 12 and to scan these different sets of notes, as required, using a single flying spot scanner. It is also possible to utilize a single reading system such as the system 9 described above for playing simultaneously a plurality of notes by providing the scanning cathode ray tube with a plurality of beam guns. This same goal may also be achieved with a single beam gun if a single beam is used to successively and repetitively scan small portions of each of the musical notes to be played. The beam can be controlled so as to cause the flying spot to jump from the recorded area of one note to that of another so fast that the multiple scanning operation is inaudible to the human ear.

As a further example, it is possible to provide the flying spot scanning system according to the present invention without the recording of, and means for reading a decay transient. In this case, the recording of the decay transient of each note may be merely eliminated from the film tracks 16 and the period T of the delay elements 91 and 97 correspondingly shortened.

It is likewise possible to provide the flying spot scanning system according to the present invention without the recording of, and means for reading an attack transient. In this case, the attack transient of each note may be eliminated from the film tracks 16 and the supply voltage $v_0$, in the horizontal deflection generator of FIG. 10, set equal to $v_1$.

The scope of the present invention should therefore be limited only by the following claims.

I claim:

1. An electrical musical instrument comprising, in combination:
   a. input means for producing at least one signal determinative of the pitch of at least one musical note to be played;
   b. record means having the attack transient, a representative sample of the steady state characteristic and the decay transient of a plurality of musical notes recorded thereon;
   c. reading means, connected to said input means, for reading from said record means first the attack transient then the steady state characteristic and finally the decay transient of one or more of said plurality of musical notes upon receipt of said at least one signal from said first input means.

2. The electrical musical instrument defined in claim 1, wherein said reading means is operative to repetitively read said sample of said steady state characteristic during the receipt of said at least one signal from said first input means.

3. The electrical musical instrument defined in claim 2, wherein said record means is a photographic film and said reading means includes:

1. means for causing light to pass through selected portions of said film; and
   2. light-sensitive means arranged in the path of light produced by said light passing means, for producing an output which is dependent upon variations in said light caused by said film.

4. The electrical musical instrument defined in claim 3, wherein said light variations are variations in intensity.

5. The electrical musical instrument defined in claim 3, wherein said light passing means includes a cathode ray tube.

6. The electrical musical instrument defined in claim 5, wherein said light passing means further includes a lens.

7. An electrical musical instrument comprising, in combination:
   a. input means for producing at least one signal determinative of the pitch of a musical note to be played;
   b. record means having the attack transient and a representative portion of a steady state characteristic of at least one musical note recorded thereon;
   c. flying spot scanning means, connected to said input means, for reading from said record means first the attack transient and then the steady state characteristic of one or more of said at least one note in dependence upon said at least one signal.

8. The apparatus defined in claim 7, wherein a plurality of notes of different pitch are recorded on said record means and said scanning means is operative to read the note of the pitch determined by said at least one signal.

9. The apparatus defined in claim 7, wherein said scanning means is operative to read said one or more of said at least one note at one of a plurality of scanning rates, thereby to reproduce the note at the pitch determined by said at least one signal.

10. The apparatus defined in claim 7, wherein said scanning means includes means for rescanning said portion of said steady state characteristic of said one or more of said at least one note for the duration of the note to be reproduced.

11. The apparatus defined in claim 10, wherein said rescanning means includes means for beginning and ending said scan at an identical point in the cycle of said portion of said steady state characteristic.

12. The apparatus defined in claim 10, wherein said rescanning means includes means for beginning and ending said scan at a positive-going zero-axis crossing of said steady state characteristic.

13. The apparatus defined in claim 10, wherein said rescanning means includes means for beginning and ending said scan at a negative-going zero-axis crossing of said steady state characteristic.

14. The apparatus defined in claim 7, wherein said record means has further recorded thereon the decay transient of said at least one musical note and wherein said scanning means is further operative to read the decay transient of said one or more of said at least one note after reading the steady state characteristic thereof.

15. The apparatus defined in claim 7, wherein said flying spot scanning means includes:
   1. means for directing a scanning beam onto said record means;
   2. means for controlling the movement of said beam across said record means; and
   3. means for reading the information scanned by said beam.

16. The apparatus defined in claim 15, wherein said record means is a film on which said at least one note is optically recorded, and wherein said scanning beam is a beam of radiant energy.

17. The apparatus defined in claim 16, wherein said beam directing means is a cathode ray tube having gun means for producing an electron beam; wherein said movement controlling means includes means for deflecting said electron beam and wherein said reading means includes transducer means for converting received radiant energy into an electrical signal.

* * * * *